Patented Apr. 14, 1942

2,279,312

UNITED STATES PATENT OFFICE 2,279,312

METHOD OF PRODUCING MODIFIED UREA-ALDEHYDE RESINS

Samuel S. Gutkin, Carnegie, Pa., assignor to Falk & Company, a corporation of Pennsylvania No Drawing. Application February 25, 1938, Serial No. 192,578

5 Claims. (Cl. 260—18)

This invention relates to the production of a mixed resinous product having typically the qualities of a urea resin.

The qualities of hardness, gloss, flow, and color stability in high order are typical of the urea resins and it has been sought by following complex and difficult procedure to impart these qualities typical of the urea resins to a resinous product consisting partially of alkyd resin by blending preformed urea-aldehyde resin and preformed alkyd resin. By following the procedure of my invention I am able in simple manner to obtain a mixed resinous product composite of a urea-aldehyde resin and an alkyd resin, which mixed product, whatever reactions be involved in its production, is susceptible of modification in the modes in which alkyd resins may typically be modified.

Briefly to summarize my invention, I first form a urea-aldehyde reaction product, and in admixture with it introduce a polyhydric alcohol and a polybasic carboxylic acid capable of reacting with the polyhydric alcohol and with the condensation product. This fundamentally gives a mixed urea-aldehyde-alkyd resinous product.

As typical examples of aldehydes which may be reacted with the urea to give the urea-aldehyde, I may name acetaldehyde, propylaldehyde, crotonaldehyde, and formaldehyde. As typical examples of polyhydric alcohols usable in my process I may give glycerin, triethylene glycol, diethylene glycol, and sorbitol. As typical of polybasic carboxylic acids which may be involved I may give phthalic anhydride, maleic anhydride, malic acid, and fumaric acid. It may be stated generally that I may use in my process any aldehyde, any polyhydric alcohol, and any polybasic carboxylic acid. The following examples are illustrative of my process:

Example No. 1

120 parts by weight of urea were mixed with 300 parts by weight of commercial (40%) formaldehyde, and the mixture was heated to a temperature of 90° F. in order to expedite condensation, and was allowed to stand until an opaque resinous material was formed.

It may be here noted, as a general proposition under this example, that in the satisfactory conduct of my process the temperature at which the urea and the aldehyde are condensed may be as low as normal room temperature, but should not be of an order much greater than 100° F. This is so that the condensate may not set so rapidly as to inhibit the next succeeding stage of the process.

To 50 parts by weight of the urea-formaldehyde condensate, thus formed, there were added in situ 154 parts by weight of high test glycerin, which apparently formed a homogeneous mass with the urea-formaldehyde. This mass was heated to a temperature of about 320° F., at which temperature there were added 148 parts by weight of phthalic anhydride, and was held at that temperature until capable of forming a clear bead.

The resultant product was a resin which was clear at the temperature of its formation, and which upon cooling to normal room temperature was a plastic, and but slightly opaque, body. This resinous product is a heat-hardening resin usable as a molding, or casting resin, or as a modifying component. It is soluble in acetone, butanol, and similar solvents; and may, if desired, be used as a coating composition. In any condition of its use the resin gives a product having in high order hardness and gloss, and one which is of high color stability. When used as a coating composition it shows gellation of high order, being flowable to form a distensible film, and has color stability in high order. The possession of these qualities in high order is not typical of an alkyd resin considered by itself.

Example No. 2

The procedure of Example No. 1 was followed up to the point at which phthalic anhydride was added at a temperature of 320° F. After the mixture formed a clear bead, and while raising the temperature of the mixture to 380° F., 76 parts by weight of fatty acids from linseed oil were gradually added in situ during a period of twenty minutes. When the total addition of fatty acids had been made, the temperature of the mixture was raised to 430° F., and at that temperature during a period of one and one-half hours an additional 484 parts by weight of fatty acids from linseed oil were added. The mixture was held at the temperature of 430° F. for one hour for the purpose of bodying. Upon cooling, an oxidizable resinous product having the consistency of a heavy bodied oil was obtained. This product is usable by itself as an oleoresinous coating composition, and upon exposure to air dries to a hard and less soluble condition. As a resinated oil, it may be considered as being an improved linseed oil substitute.

Example No. 3

In this example the addition of fatty acids from linseed oil was ended with the first addition of 76 grams described in Example No. 2. The product obtained was intermediate the product obtained in Example No. 1 and that obtained in Example No. 2 in the sense that it is more plastic at normal room temperature than is the product of Example No. 1.

Example No. 4

To 100 parts by weight of the resinated oil obtained as the product of Example No. 2 there were added 100 parts by weight of linseed oil, the temperature of the resinous product being maintained at 430° F. while the linseed oil was very slowly added. The product is a coating material of oleoresinous nature having by virtue of its resin content capacity to acquire gloss and hardness in a film.

Example No. 5

The procedure of Example No. 1 was followed to the point of adding phthalic anhydride at a temperature of 320° F., and was held to a clear bead. To the clear resin resulting from this procedure 76 parts by weight of stearic acid were added in situ, during a period of twenty minutes, while raising the temperature of the mixture to 380° F.

The product upon cooling was a molding and casting resin generally similar to the resinous product obtained in accordance with Example No. 3, but more highly plastic than the product of Example No. 3.

For the fatty acids from linseed oil in the foregoing examples there may be substituted any of the other fatty oil acids.

As to temperature, it may be noted that while the temperatures given are not definitely critical, attention should be paid to temperature both in the primary stages and in the stages in which the primary product is modified. The reactions will take place at lower temperatures than those given, but do not take place in satisfactory manner if the temperature is so low that the reaction mass tends substantially to become inert. In heating upwardly beyond the temperatures given, care should be taken that the temperature is not so high, nor the time of heating so prolonged, as to cause a separation in the mass by premature gellation therein. Temperatures and time of heating should be more closely held in use of maleic anhydride and fumaric acid (to avoid premature gellation) than is necessary in using phthalic anhydride.

Various procedural modifications may be made. For instance, the procedure of Example No. 1 may be modified by heating a mixture of urea-aldehyde and phthalic anhydride. An example of this procedure giving suitable proportions is as follows:

Example No. 6

To 50 parts by weight of urea-formaldehyde, made as in Example No. 1, there were added in situ 148 parts by weight of phthalic anhydride, and the mixture was brought to an approximate temperature of 320° F. Upon gellation the resultant product was a stiff, infusible mass, having the typical characteristics of a molding and casting resin.

Example No. 7

To a mass made up substantially as in Example No. 6, esterification was carried on, by adding to the mass in situ, after it had been brought to a clear bead and before gellation therein, 154 parts by weight of high test glycerin.

The resultant product was substantially identical with that obtained at a similar stage by following the procedure of Example No. 1. The product was susceptible of the various modifications given above in Examples Nos. 2, 3, 4, and 5 as based upon the procedure of Example No. 1.

I have found maleic anhydride to be a particularly effective equivalent for phthalic anhydride, and having found soya bean fatty acids to be a commercially desirable equivalent for linseed oil fatty acids. In substituting reagents in my process consideration should be given to the chemical equivalency of the substituted reagents. Thus in paralleling Example No. 1 with maleic anhydride, and using 50 parts by weight of urea-formaldehyde, and 154 parts by weight of high test glycerine, 95 parts by weight of maleic anhydride should replace the 148 parts by weight of phthalic anhydride; and under similar conditions 113 parts by weight of fumaric acid should be used to replace 148 parts by weight of phthalic anhydride.

Considering the examples given above, it may be explained that the several modifications illustrated in them are modifications known with respect to the alkyd resins, and as made by me have an effect substantially like that experienced when practised upon an alkyd resin as such. I have discovered, however, that the qualities appropriate to a urea resin, and exhibited in the product of Example No. 1, persist in the products comprising the various alkyd modifications.

The above procedures give, as indicated, a resinous product having all the fundamental qualities and capacities of an alkyd resin, combined with the characteristics which typify the urea resins. This result is obtained by simple procedure involving an uninterrupted sequence of steps, and by utilizing conditions (short of gellation) established in one step to promote the desired action in the next succeeding step. Although previous to my invention there have been made mixtures of preformed urea-aldehyde resin and preformed alkyd resin, the procedure necessary in effecting such mixture is laborious and in degree difficult. Such mixtures of the preformed resinous products do not retain both the characteristics of the urea resins and the characteristics of the alkyd resins in as high order as I obtain by conducting reaction of both a polybasic alcohol and urea-aldehyde with a polycarboxylic acid.

In this connection it may be noted that a urea-aldehyde tends under the conditions of the process to be effectively alcoholic in its nature, and that it is susceptible of reaction with a polycarboxylic acid. The primary reaction involved in my process is therefore fundamentally an esterification reaction.

I claim as my invention:

1. The herein described method of producing a modified urea-aldehyde resin suitable for use in coatings by following the sequential steps of preparing a urea-aldehyde condensate by reacting urea and aldehyde in the approximate proportion of 1 mol. of urea to 2 mols. of aldehyde at low temperature not substantially exceeding 100° F., while the urea-aldehyde condensate is still ungelled and of an alcoholic nature adding a polyhydric alcohol and then after heating to a temperature of about 320° F. adding a polybasic carboxylic acid, the proportioning of the additions to each other and to the urea-aldehyde condensate being such that the polyhydric alcohol is in excess of the polybasic carboxylic acid and such that each of them is in excess of the condensate, and then with further temperature elevation making at least one addition of fatty oil acid.

2. The herein described method of producing a modified urea-aldehyde resin suitable for use in coatings by following the sequential steps of preparing a urea-aldehyde condensate by reacting urea and aldehyde in the approximate proportion of 1 mol. of urea to 2 mols. of aldehyde at low temperature not substantially exceeding 100° F., while the urea-aldehyde condensate is still ungelled and of an alcoholic nature adding a polyhydric alcohol and then after heating to a temperature of about 320° F. adding a polybasic carboxylic acid, the proportioning of the additions to each other and to the urea-aldehyde condensate being such that the polyhydric alcohol is in excess of the polybasic carboxylic acid and such that each of them is in excess of the condensate, and then with further temperature elevation making at least one addition of fatty oil acid possessing unsaturation.

3. The herein described method of producing a modified urea-formaldehyde resin suitable for use in coatings by following the sequential steps of preparing a urea-formaldehyde condensate by reacting urea and formaldehyde in the approximate proportion of 1 mol. of urea to 2 mols. of formaldehyde at low temperature not substantially exceeding 100° F., while the urea-formaldehyde condensate is still ungelled and of an alcoholic nature adding a polyhydric alcohol and then after heating to a temperature of about 320° F. adding a polybasic carboxylic acid, the proportioning of the additions to each other and to the urea-formaldehyde condensate being such that the polyhydric alcohol is in excess of the polybasic carboxylic acid and such that each of them is in excess of the condensate, and then with further temperature elevation making at least one addition of fatty oil acid.

4. The herein described method of making a urea-formaldehyde resin suitable for use in coatings in accordance with the procedure of claim 3 in which the fatty oil acid addition consists of the linseed oil fatty acids.

5. The herein described method of making a modified urea-formaldehyde resin suitable for use in coatings in accordance with the procedure of claim 3 in which the fatty oil acid addition consists of the soya bean oil fatty acids.

SAMUEL S. GUTKIN.